United States Patent
Asiri et al.

(10) Patent No.: US 12,142,427 B2
(45) Date of Patent: *Nov. 12, 2024

(54) GEL ELECTROLYTE SPLIT CELL SUPERCAPACITOR

(71) Applicant: Imam Abdulrahman Bin Faisal University, Dammam (SA)

(72) Inventors: Sarah Mousa Maadi Asiri, Dammam (SA); Emre Cevik, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,733

(22) Filed: Jan. 5, 2024

(65) Prior Publication Data

US 2024/0145180 A1    May 2, 2024

Related U.S. Application Data

(63) Continuation of application No. 18/364,504, filed on Aug. 3, 2023, now Pat. No. 11,955,279, which is a continuation of application No. 17/677,492, filed on Feb. 22, 2022, now Pat. No. 11,769,639.

(51) Int. Cl.
*H01G 11/38* (2013.01)
*H01G 11/36* (2013.01)

(52) U.S. Cl.
CPC ............. *H01G 11/38* (2013.01); *H01G 11/36* (2013.01)

(58) Field of Classification Search
None
See application file for complete search history.

(56) References Cited

U.S. PATENT DOCUMENTS

| 11,121,356 B2 | 9/2021 | Zhang |
| 2018/0244029 A1 | 8/2018 | Kim |
| 2023/0268137 A1 | 8/2023 | Asiri |
| 2024/0145180 A1 * | 5/2024 | Asiri ..................... H01G 11/06 |

FOREIGN PATENT DOCUMENTS

| CA | 2 720 600 | 9/2017 |
| CN | 103258655 A | 8/2013 |
| CN | 105932252 A | 9/2016 |
| CN | 106711413 B | 7/2019 |
| WO | 2013/159219 A1 | 10/2013 |

OTHER PUBLICATIONS

Zhang, et al. ; Electrochemical capacitive properties of all-solid-state supercapacitors based on ternary MoS2/CNTs-MnO2 hybrids and ionic mixture electrolyte ; Journal of Alloys and Compounds, vol. 780 ; pp. 276-283 ; Apr. 5, 2019 ; Abstract Only.

Li, et al. ; Fabrication and electrochemical properties of well-dispersed molybdenum oxide nanoparticles into nitrogen-doped ordered mesoporous carbons for supercapacitors ; Materials Research Express, vol. 6, No. 10 ; Abstract Only.

Yan, et al. ; A general strategy to construct N-doped carbon-confined MoO2 and MnO for high-performance hybrid supercapacitors ; Vacuum 165 ; Apr. 2019 ; Abstract Only.

Huang, et al. ; Enhancing sodium-ion storage performance of MoO2/N-doped carbon through interfacial Mo—N—C bond ; Science China Materials vol. 64 ; Jun. 28, 2020 ; Abstract Only.

* cited by examiner

*Primary Examiner* — Eric W Thomas
(74) *Attorney, Agent, or Firm* — Oblon, McClelland, Maier & Neustadt, L.L.P.

(57) ABSTRACT

A nanocomposite electrode and a supercapacitor device including said nanocomposite electrode. The nanocomposite electrode includes a mixture of at least one binding compound, at least one conductive additive, and at least one molybdenum doped carbon material coated onto a substrate. The supercapacitor device includes two nanocomposite electrodes disposed facing one another, wherein the substrate of each nanocomposite electrode is coated with the mixture on an inside facing surface and the outer surfaces of the nanocomposite electrodes are not coated with the mixture, and the inside facing surfaces are separated by at least one electrolyte.

17 Claims, 24 Drawing Sheets

GEL ELECTROLYTE SPLIT CELL SUPERCAPACITOR

CROSS-REFERENCE TO RELATED APPLICATIONS

The present application is a Continuation of U.S. application Ser. No. 18/364,504, now allowed, having a filing date of Aug. 3, 2023 which is a Continuation of U.S. application Ser. No. 17/677,492, now U.S. Pat. No. 11,769,639, having a filing date of Feb. 22, 2022.

BACKGROUND OF THE INVENTION

Field of the Invention

The present disclosure is directed to an electrode, and particularly to a nanocomposite electrode, and a supercapacitor comprising said nanocomposite electrode.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Due to their high-power density, rapid charging and discharging, and long cycle life, supercapacitors are becoming one of the most important energy storage devices. As compared to batteries and traditional capacitors, supercapacitors have been positioned as new energy-storage devices, which use electrochemical porous or activated materials as electrodes.

Recently, the use of molybdenum oxide in supercapacitors has increased because of its high energy density, and chemical and physical properties such as stable crystal structure and its contribution to faradaic reactions, which are important in energy-storage applications. See C. V. Krishnan, M. Garnett, New insights into the double layer structure from impedance measurements: Implications for biological systems, Electrochimica Acta. 51 (2006) 1541-1549, incorporated herein by reference in its entirety. In addition, molybdenum oxide has many benefits such as, reducing charge-discharge time, generating a direct current pathway, growing the electrolyte-electrode contact region, and limiting mechanical degradation. Carbon nanomaterials, such as graphene and carbon nanotubes, also have multiple desirable properties for supercapacitors such as high surface area, high thermal and electrical conductivity, high flexibility and tensile strength, and chemical sensitivity. Excellent capacitive performance has been yielded through integrating graphene-based electrodes with commercial organic electrolytes.

Accordingly, it is one object to the present disclosure to construct two different types of carbon nanocomposite electrodes 1) graphene nanosheets (G) and 2) carbon nanotube (CNT) both doped with molybdenum oxide. It is another object of the present disclosure to assemble symmetric supercapacitor devices from said nanocomposite electrodes in order to provide devices with high performances in terms of specific capacity, specific energy, rate capability, and cycle performance with higher coulombic efficiency.

SUMMARY

The present disclosure presents a nanocomposite electrode, including a substrate a binding compound, a conductive additive, and a molybdenun doped carbon material. The substrate is coated with a mixture of 5-10 wt % of the binding compound, 65-92 wt % of the conductive additive, and 3-25 wt % of the molybdenum doped carbon material based on the total weight of the binding compound, conductive additive, and molybdenum doped carbon material.

In an embodiment, the molybdenum doped carbon material is at least one selected from the group consisting of molybdenum doped graphene and molybdenum doped carbon nanotubes (CNTs). The binding compound is at least one selected from the group consisting of polyvinylidene fluoride and n-methylpyrrolidone. The conductive additive is at least one selected from the group consisting of graphite, activated carbon, reduced graphene oxide, carbon nanotubes, carbon nanofibers, and carbon black. The substrate is formed from at least one material selected from the group consisting of copper, aluminum, nickel, iron, and steel.

In an embodiment, the molybdenum in the molybdenum doped carbon material is at least one selected from the group consisting $\alpha$-$MoO_3$, $\beta$-$MoO_3$, and $\gamma$-$MoO_3$.

In an embodiment, molybdenum is homogeneously distributed throughout the molybdenum doped carbon material.

In an embodiment, the molybdenum doped carbon material is molybdenum doped graphene. The molybdenum doped carbon graphene has a sheet structure, the molybdenum is on a surface of the sheets, and the molybdenum doped graphene comprises 70-80 wt % C, 15-20 wt % O, 4-8 wt % H, and 3-10 wt % Mo, based on the total weight of the C, O, H, and Mo.

In an embodiment, the molybdenum doped carbon material is molybdenum doped CNTs. The molybdenum doped CNTs have a diameter of 10-100 nm, the molybdenum is on walls of the CNTs, and the molybdenum doped CNTs comprise 60-70 wt % C, 20-25 wt % O, 4-8 wt % H, and 10-20 wt % Mo, based on the total weight of the C, O, H, and Mo.

In an embodiment, the thickness of the coating of the mixture on the substate is 500 nm-60 µm.

The present disclosure also provides a method of making the molybdenum doped carbon material. The method includes heating a carbon material such as carbon nanotubes or graphene to at least 450° C. for 10 minutes to an hour to form a cracked carbon material. Also, sonicating the cracked carbon material in water for at least 5 minutes to form a dispersion. Adjusting the pH of the dispersion to 1.5-3 with an acid to form a suspension. The method further includes, mixing $MoO_4^{2-}$ molybdate ion into the suspension and stirring for at least 48 hours at 20-25° C. to form a solution. Also, filtering, washing with water, and drying the solution at a temperature of at least 70° C. for at least 3 hours, to form the molybdenum doped carbon material.

In an embodiment, a supercapacitor device includes two nanocomposite electrodes disposed facing one another, wherein the substrate of each nanocomposite electrode is at least partially coated with the mixture on an inside facing surface and the outer surfaces of the nanocomposite electrodes are not coated with the mixture. The inside facing surfaces are separated by an electrolyte.

In an embodiment, the electrolyte is at least one polyol compound mixed with at least one selected from the group consisting of an alkali metal hydroxide, an alkaline earth hydroxide, an alkali metal salt, and an alkaline earth salt. The polyol compound is at least one selected from the group consisting of glycerol, ethylene glycol, and propylene glycol.

In an embodiment, the supercapacitor device including 15-25 wt % molybdenum doped graphene has an energy density of 40-60 Wh/kg at a specific power of 250-300 W/kg. and a specific capacitance of 450-500 F/g at 0.5-5 A/g. At least 90% of the initial specific capacitance is maintained after 10,000 charge-discharge cycles.

In an embodiment, the supercapacitor device including 15-25 wt % molybdenum doped CNTs has an energy density of 30-50 Wh/kg at a specific power of 250-300 W/kg, and a specific capacitance of 450-500 F/g at 0.5-5 A/g. At least 88% of the initial specific capacitance is maintained after 10,000 charge-discharge cycles.

In an embodiment, the supercapacitor device is electrically connected to a sensor, and functions as a battery in a wearable device.

In an embodiment, 2-10 of the supercapacitor devices are connected in parallel and/or series.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figures 1A, 1B, 1C, 1D:
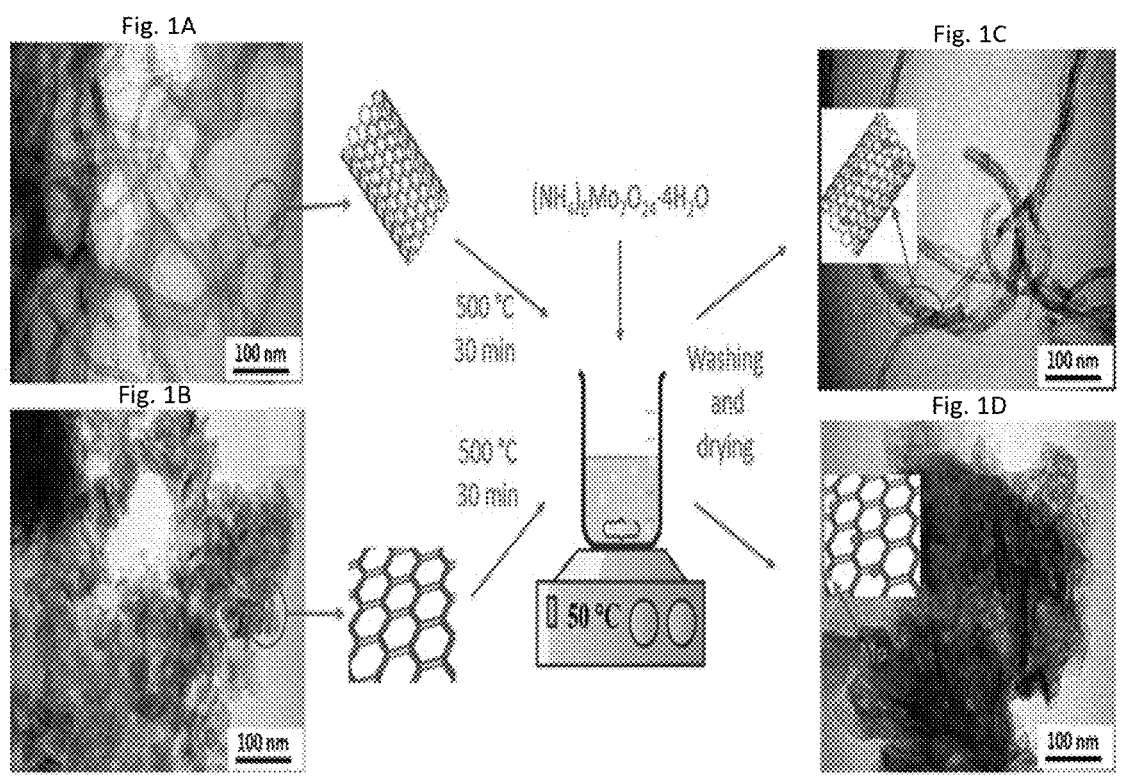
FIGS. 1A-1D illustrates schemes of CNT-Mo and G-Mo preparation and TEM images of (A) CNT, (B) G, (C) CNT-Mo, and (D) G-Mo.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, "substrate" refers to a substrate including a conducting material, which may be, but is not in any manner limited to, metals, metal alloys, and other conducting materials.

As used herein, "electrolyte" refers to substances that conduct electric current because of dissociation of the electrolyte into positively and negatively charged ions.

As used herein, "binding compound" or "binding agent" or "binder" refers to compounds or substances which holds or draws other materials together to form a cohesive whole mechanically, chemically, by adhesion or cohesion.

As used herein, "conductive additive" refers to substances or compounds or materials which when added to another substance or compound or material of low electrical conductivity, increase the conductivity thereof.

As used herein, a "voltammogram" is a graph that can be drawn after an electrochemical experiment. This graph has a typical, recognizable form in which the electron flow (current: I) is measured in Volts against the potential (E).

As used herein, "amount" refers to the level or concentration of one or more reactants, catalysts, present in a reaction mixture.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

Embodiments of the present disclosure are directed to a molybdenum (Mo) doped carbon nanotube (CNT) or graphene (G) nanocomposite or nanocomposites. The nanocomposites of the present disclosure can be used as an electrode material in electrochemical energy storage devices. The nanocomposite electrodes, and supercapacitors thereof, are described according to physical and electrochemical performance. As described herein in certain embodiments the electrodes and supercapacitors demonstrate high specific capacitance across a wide operation potential, opening potential application in a variety of energy storage devices.

FIG. 1 illustrates a method for preparing Mo doped CNT and G, herein abbreviated as CNT-Mo and G-Mo, respectively. The order in which the method of FIG. 1 is described is not intended to be construed as a limitation, and any number of the described method steps can be combined in any order to implement the method. Additionally, individual steps may be removed or skipped from the method without departing from the spirit and scope of the present disclosure. Although the method is described in terms of its implementation specifically for a CNT and G, it may be appreciated that the teachings of the present disclosure may be utilized for other carbon-based materials, such as but not limited to, graphite, activated carbon, reduced graphene oxide, carbon nanofibers, and carbon black.

The CNT and G are first prepared separately by heating to at least 450° C., preferably 450-600° C., or 500-550° C. for 10 minutes (mins) to 1 hour (h), preferably 20-45 mins, or 30-40 mins to obtain a crack formation on the G and CNT structures. The cracked structures are then dispersed in water and sonicated for at least 5 minutes, preferably 5-30 mins, or 15-20 minutes. The method further includes adjusting the pH to 1.5-3 with an acid to form a suspension. In an embodiment, the acid may be any acid known in the art such as but not limited to a hydrogen halide, nitric acid, or carbonic acid. $MoO_4^{2-}$ molybdate ion is then added to suspension while stirring for at least 48 hours, preferably 48-96 h, or 60-70 h, at 20-25° C., preferably 21-24° C., or 22-23° C. to form a solution. In an embodiment, the $MoO_4^{2-}$ molybdate ion is selected from a group consisting of sodium molybdate, ammonium molybdate, diammonium molybdate, iron (II) molybdate, ferric molybdate, nickel molybdate, cobalt molybdate, manganese molybdate, and hydrates thereof. In an embodiment, the $MoO_4^{2-}$ molybdate ion is ammonium molybdate (AM) tetrahydrate. The method further includes filtering, washing with water, and drying the solution at a temperature of at least 70° C., preferably 70-100° C., or 80-90° C. for at least 3 hours, preferably 3-10 h, or 5-6 h, to form the CNT-Mo or G-Mo.

In an embodiment, prior to doping with Mo, the CNT have a narrow diameter of 5-50 nm, preferably 10-30 nm, or 15-25 nm, and a length of 100 nm-10 μm, preferably 500 nm-5 μm, or 1-3 μm and G has a wrinkled dispersed sheet structure, FIGS. 1A and 1B, respectively. In some embodiments, following doping with Mo, the CNT-Mo have a multiwalled structure with a diameter of 10-100 nm, preferably 25-50 nm, or 30-40 nm, and a length of 100 nm-10 μm, preferably 500 nm-5 μm, or 1-3 μm, in which the Mo is interconnected in the walls (FIG. 1C), and the G-Mo form aggregated structures with the Mo bonded in the nanosheets (FIG. 1D). It can also be observed from the TEM images (FIG. 1C, 1D) that interfacial adhesion occurs between the CNT and $MoO_3$ and the G and $MoO_3$ due to strong interactions between the metal oxide and carboxyl groups and hydroxy groups on the surfaces of the CNT and G.

Figure 6A:
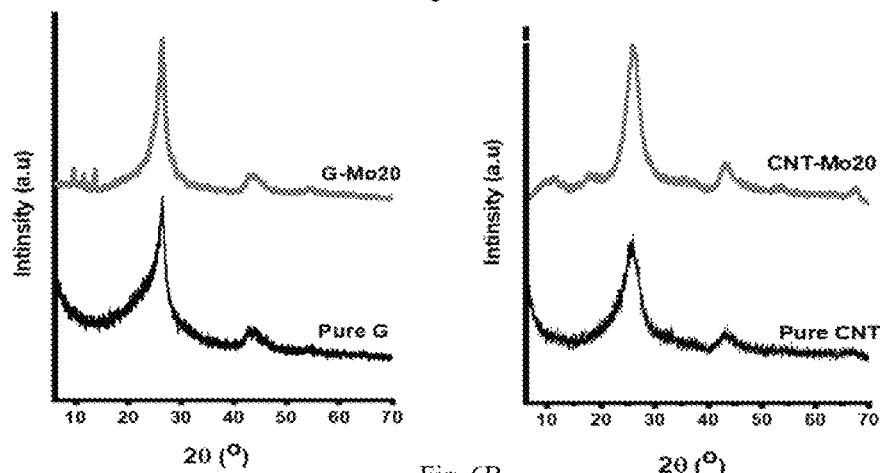
FIGS. 6A-6B illustrate (A) XRD and (B) FT-IR spectra of CNT-Mo and G-Mo compared to undoped G and CNT and ammonium molybdate tetrahydrate (AM)

The X-ray diffraction (XRD) patterns of the CNT-Mo and G-Mo compared to pure CNT and G is shown in FIG. 6A. In an embodiment the (002) diffraction peak of the G and CNT is 24-27°, preferably 25-26.5°, or 25.5-26°, and the (100) diffraction peak is 41-44.5°, preferably 42-44°, or 43-43.5°. Following doping with Mo the patterns remain the same other than improved signal, and the appearance of weak $MoO_3$ peaks. The higher signal to noise ratio of the Mo doped materials is due to the incorporation of Mo into the structures, however the Mo itself has a low diffracting intensity. In an embodiment, the $MoO_3$ diffraction peaks in the CNT and G are as follows, the (020) diffraction peak is 10-14° preferably 11-13°, or 11.5-12.5°, the (110) diffraction peak is 18-22°, preferably 19-21°, or 19.5-20.5°, the (002) diffraction peak is 50-54°, preferably 51-53°, or 51.5-52.5°, and the (202) diffraction peak is 66-70°, preferably 67-69°, or 67.5-68.5°. In an embodiment, the $MoO_3$ at least one of α-$MoO_3$, β-$MoO_3$, and γ-$MoO_3$. In an embodiment, the $MoO_3$ in the G and CNT is 90-100% α-$MoO_3$, preferably 95%. or 100%, 0-10% β-$MoO_3$, preferably 5%, or 0%, and 0-10% γ-$MoO_3$, preferably 5%, or 0%. In an embodiment, the $MoO_3$ in the G and CNT is only α-$MoO_3$.

Figure 6B:
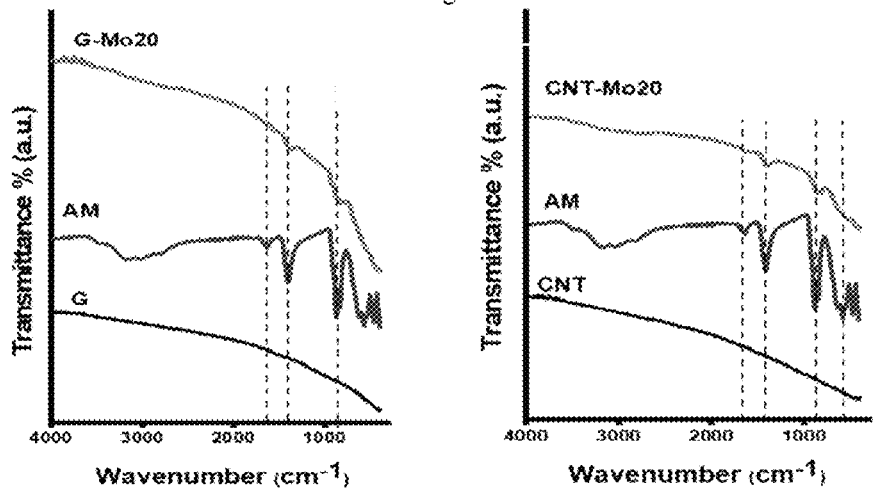

FIG. 6B demonstrates the FTIR spectrum of ammonium molybdate (AM), G, CNT, G-Mo, and CNT-Mo. In an embodiment, the CNT and G FTIR spectra do not have any distinguishing features, while AM shows broad feature at 3600-2600 $cm^{-1}$, preferably 3300-2800 $cm^{-1}$, or 3100-3000 $cm^{-1}$ corresponding to the stretching mode of the O—H bond indicating the presence of OH groups. Two peaks of AM at 1400-1450 $cm^{-1}$, preferably 1410-1430 $cm^{-1}$, or 1415-1420 $cm^{-1}$ and 1600-1650 $cm^{-1}$, preferably 1610-1630 $cm^{-1}$, or 1615-1620 $cm^{-1}$ are assigned to the N—H vibration band of ammonium and molecular water, respectively. AM peaks assigned to the stretching of Mo—O bond at 550-600 $cm^{-1}$, preferably 560-590 $cm^{-1}$, or 570-580 $cm^{-1}$, stretching of Mo—O—Mo bonds at 800-830 $cm^{-1}$, preferably 810-820 $cm^{-1}$, or 815-818 $cm^{-1}$, and bending bonds of Mo—O—Mo at 850-900 $cm^{-1}$, preferably 860-890 $cm^{-1}$, or 870-880 $cm^{-1}$. In some embodiments, the G-Mo and CNT-Mo the peaks remain similar to the AM, G, and CNT. In some embodiments, the G-Mo and CNT-Mo comprise less than 50 ppm, preferably less than 30 ppm, or no traces of AM.

Figure 2A:
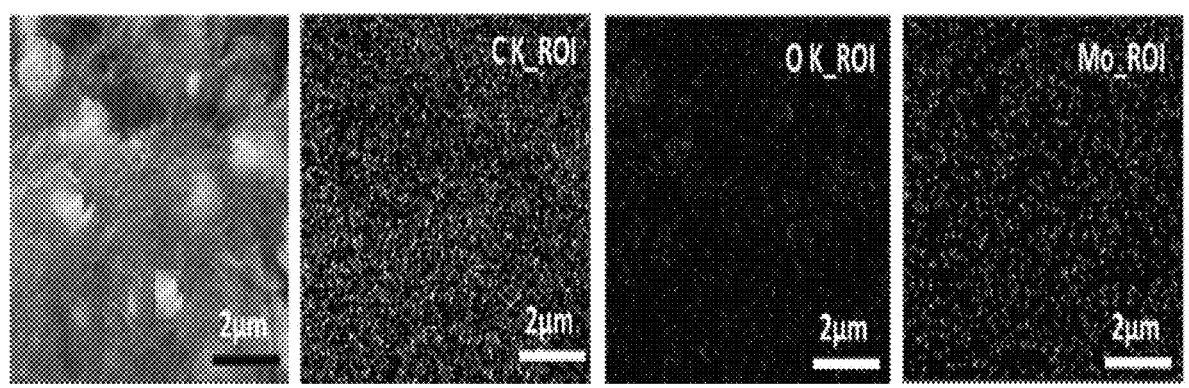
FIGS. 2A-2B illustrate SEM images and elemental mapping of (A) CNT-Mo and (B) G-Mo.
Figure 2B:
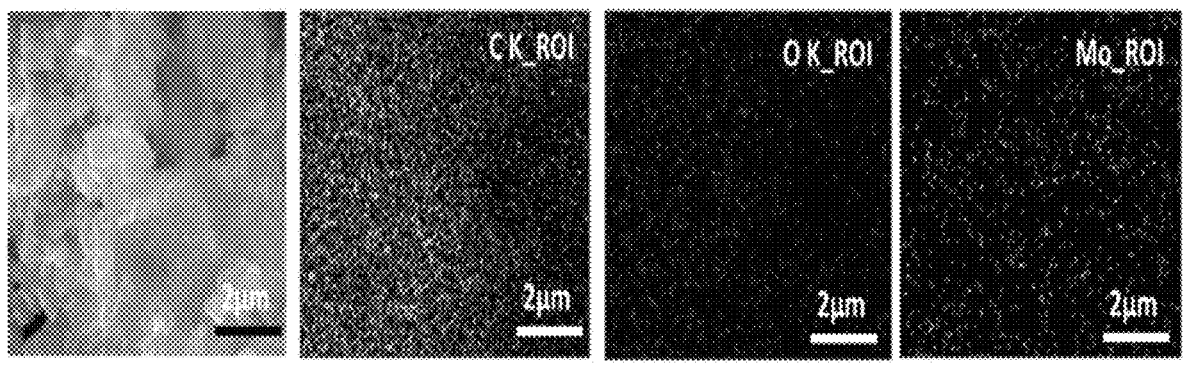
Figure 7A:
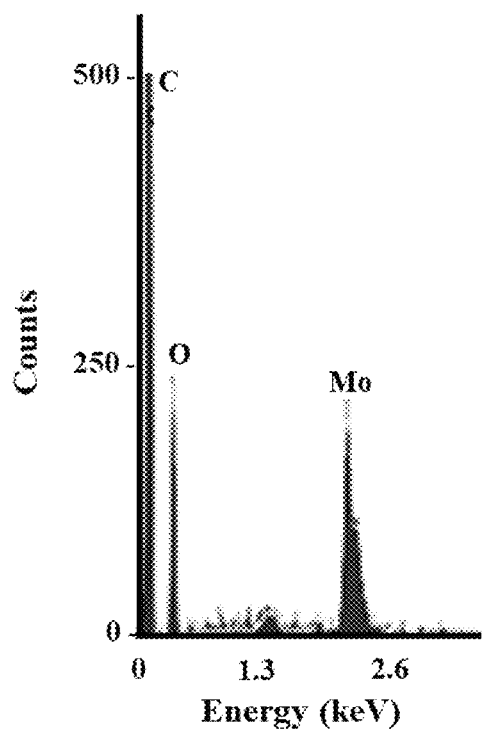
FIGS. 7A-7B illustrate EDX spectra of (a) CNT-Mo and (b) G-Mo.
Figure 7B:
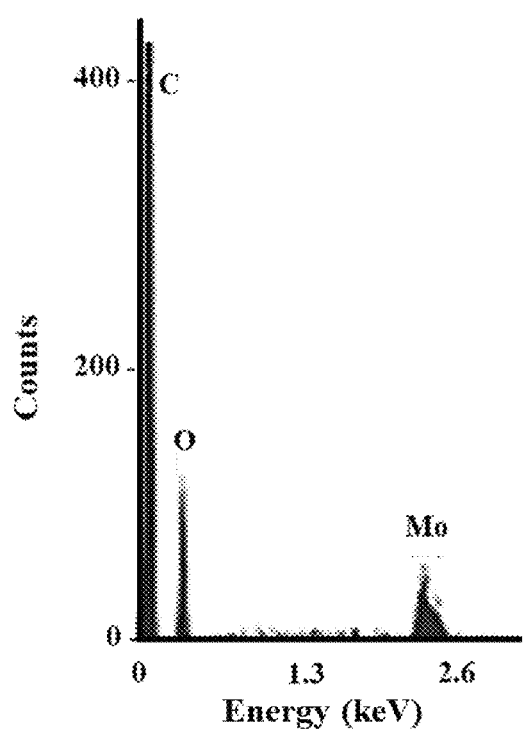

The SEM images with EDX analysis (FIGS. 2A and B) show that Mo is homogeneously distributed in the G-Mo and CNT-Mo. It was observed that carbon (C), oxygen (O), and molybdenum (Mo) are uniformly distributed in the structures. The EDX spectrum (FIG. 7) shows successful doping of Mo onto the CNT and G which is consistent with the result of XRD and FTIR analysis. In an embodiment, the G-Mo is 70-80 wt % C, preferably 72-78 wt %, or 74-76 wt %, 15-20 wt % O, preferably 16-19 wt % or 17-18 wt %, 4-8 wt % H, preferably 5-7 wt %, or 6-6.5 wt % and 3-10 wt % Mo, preferably 5-8 wt %, or 6-7 wt %, based on the total weight of the C, O, H, and Mo. In an embodiment, the G-Mo is 75 wt % C, 15 wt % O, 5 wt % H, and 5 wt % Mo. In an embodiment, the CNT-Mo is 60-70 wt % C, preferably 62-68 wt %, or 64-66 wt %, 20-25 wt % O, preferably 21-24 wt % or 22-23 wt %, 4-8 wt % H, preferably 5-7 wt %, or 6-6.5 wt % and 10-20 wt % Mo, preferably 12-18 wt %, or 14-16 wt %, based on the total weight of the C, O, H, and Mo. In an embodiment, the CNT-Mo is 65 wt % C, 20 wt % O, 5 wt % H, and 10 wt % Mo.

In some embodiments, the differences in the morphologies of the CNT and G after doping with Mo indicate that a substantial amount of the Mo, approximately 10 wt %, is dispersed within the structures. The addition of the Mo increases the potential contact area of an electrode made these materials, with an electrolyte, allowing more of the electrolyte to penetrate the CNT and between the G layers. The Mo may bring more active sites on the electrode surface and increase the surface area which is necessary for ion adsorption, thereby improving performance of energy storage (as discussed later).

The nanocomposite electrode comprises a substrate, at least one binding compound, at least one conductive additive, and at least one molybdenum doped carbon material. In some embodiments, a mixture of the binding compound, the conductive additive, and the molybdenum doped carbon material is at least partially coated on the substrate. In some embodiments, the mixture comprises 5-10 wt%, preferably 6-9 wt % or 7-8 wt % of the binding compound, 65-92 wt %, preferably 70-80 wt %, or 73-77 wt % of the conductive additive, and 3-25 wt %, preferably 5-20 wt %, or 10-15 wt % of the molybdenum doped carbon material based on the total weight of the binding compound, conductive additive, and molybdenum doped carbon material. Herein, the electrodes are labeled as G-MoX or CNT-MoX, wherein X is the wt % of molybdenum doped carbon material.

In some embodiments, the conductive additive includes a conductive material and a polymer. The conductive additive allows for improved adhesion between the mixture and the electrode substrate. This intimate connection results in lower electrical resistance and, accordingly, lower impedance for the nanocomposite electrode and its associated device. In one embodiment, the conductive additive is at least one selected from the group consisting of graphite, activated carbon, reduced graphene oxide, carbon nanotubes, carbon nanofibers, and carbon black. In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is selected from the group consisting of a fluorine containing polymer including polyvinylidene fluoride and N-methyl pyrrolidone (NMP).

In some embodiments, the molybdenum doped carbon material is G-Mo and/or CNT-Mo. Although the molybdenum doped carbon material is described in terms as CNT-Mo and G-Mo, it may be appreciated that the teachings of the present disclosure may be utilized for other carbon-based materials, such as but not limited to, graphite, activated carbon, reduced graphene oxide, carbon nanofibers, and carbon black. In an embodiment, the substrate may be made from one or more of materials such as, stainless steel, aluminum, nickel, copper, platinum, zinc, tungsten, and titanium. In one embodiment, the substrate may be an aluminum current collector.

A method of making a nanocomposite electrode using the molybdenum doped carbon material is disclosed. The order in which the method is described is not intended to be construed as a limitation, and any number of the described method steps can be combined in any order to implement the method. Additionally, individual steps may be removed or skipped from the method without departing from the spirit and scope of the present disclosure.

The method includes dissolving at least one binding compound, and at least one conductive additive to form a slurry. In an embodiment, the slurry was obtained by mixing polyvinylidene fluoride (HSV 900 PVDF) binder in a mixture containing at least one conductive additive at a particular temperature with constant stirring until homogenous mixture obtained. In one embodiment, the slurry is stirred at a temperature of 70° C. until the slurry is homogeneous.

The method further includes mixing 3-25 wt % of the molybdenum doped carbon material into the slurry for creating a synthesis mixture. In an embodiment, various concentrations of molybdenum doped carbon material are added in the resultant slurry. In an embodiment, the concentration of the molybdenum doped carbon material in the resultant slurry may be 5, 10, and 20% (w/w).

The method includes coating the synthesis mixture onto the substrate to form the nanocomposite electrode. In one embodiment, the coating is performed using an automatic coating machine. In an embodiment, the coating is less than 100 μm, preferably 500 nm-100 μm, 20-80 μm, or 30-50 μm. In an embodiment, the synthesis mixture coats at least 80% of the substrate, preferable 90%, or 100%.

The method includes drying the nanocomposite electrode at a temperature less than 100° C. In an embodiment, after coating the substrate, the developed electrode is dried in a standard oven at 70° C. Appropriately sized electrodes are then cut from dried electrode. In accordance with one embodiment, a precision pneumatic disk cutter may be used to cut and obtain, from the substrate, electrodes corresponding to a die size of the precision pneumatic disk cutter. In an embodiment, the substrates have a diameter of 1-6 cm, preferably 2-5 cm, 3-4 cm. Although diameter implies a circular shape of the substrate, the electrodes may be but are not limited to circular, rectangular, and square shaped.

Embodiments of the present disclosure also relate to a supercapacitor device including the nanocomposite electrode and an electrolyte. In an embodiment, the supercapacitor device comprises two nanocomposite electrodes disposed facing one another. The substrate of each nanocomposite electrodes is coated with the mixture on an inside facing surface and the outer surfaces of the nanocomposite electrodes are not coated with the mixture. The inside facing surfaces are separated by the electrolyte.

In an embodiment, the electrolyte is a polyol compound mixed with at least one selected from the group consisting of alkali metal hydroxides, alkaline earth hydroxides, alkali metal salts, and alkaline earth salts including but not limited to sodium hydroxide, potassium hydroxide, lithium hydroxide, barium hydroxide, calcium hydroxide, sodium chloride, potassium bromide, magnesium chloride to form a gel electrolyte. The polyol compound is a compound containing multiple hydroxyl groups, such as but not limited to glycerol, ethylene glycol, and propylene glycol. In an embodiment, the electrolyte may be a glycerol-KOH gel electrolyte. The KOH is 1-6 M in the glycerol, preferably 2-5 M or 3-4 M. Gel electrolytes compared to solution electrolytes increase the flexibility and elasticity of the electrode and thereby improve the cyclability and allow for use in wearable electronics.

In an embodiment, the supercapacitor device made with 15-25 wt % G-Mo as the molybdenum doped carbon material has an energy density of 40-60 Wh/kg, preferably 45-55 Wh/kg, or 47-52 Wh/kg at a specific power of 250-300 W/kg, preferably 260-290 W/kg, or 270-280 W/kg. In an embodiment, the supercapacitor device made with 15-25 wt % G-Mo as the molybdenum doped carbon material has a specific capacitance of 450-500 F/g, preferably 460-490 F/g. or 470-480 F/g at 0.5-5 A/g. In an embodiment, the supercapacitor device made with 15-25 wt % G-Mo as the molybdenum doped carbon material maintains at least 90%, preferably 95%, or 100% of said specific capacitance after 10,000 charge-discharge cycles.

In an embodiment, the supercapacitor device made with 15-25 wt % CNT-Mo as the molybdenum doped carbon material has an energy density of 30-50 Wh/kg, preferably 35-45 Wh/kg, or 37-42 Wh/kg at a specific power of 250-300 W/kg, preferably 260-290 W/kg, or 270-280 W/kg. In an embodiment, the supercapacitor device made with 15-25 wt % CNT-Mo as the molybdenum doped carbon material has a specific capacitance of 450-500 F/g at 0.5 A/g. preferably 460-490 F/g, or 470-480 F/g at 0.5-5 A/g. In an embodiment, the supercapacitor device made with 15-25 wt % CNT-Mo as the molybdenum doped carbon material maintains at least 88%, preferably 95%, or 100% of said specific capacitance after 10,000 charge-discharge cycles. In some embodiments, a higher concentration of the molybdenum doped carbon material, such as 15-25 wt %, improves the performance of the electrodes and supercapacitors, which may be due to the higher ionic conductivity that creates a convenient pathway for faster ion diffusion through the material.

Figure 5A:
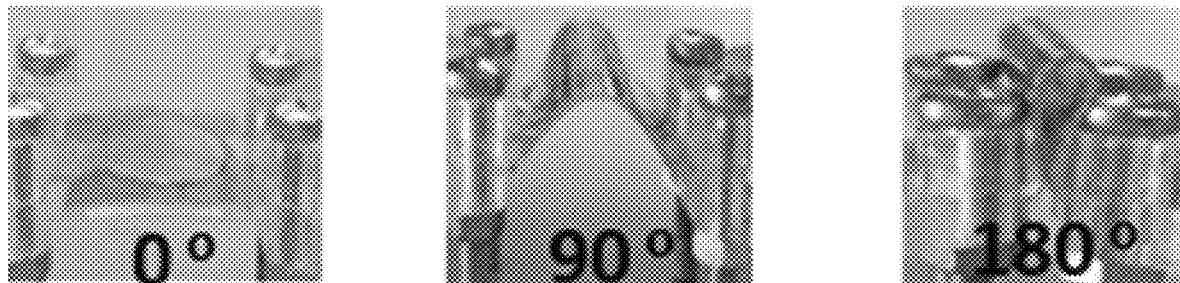
FIGS. 5A-5G illustrate (A) Digital photographs of flexible supercapacitor G-Mo20 in different bending angles. (B) Digital photograph a light-emitting diode (LED) powered by the supercapacitor with G-Mo5-Gly-KOH. (C) Digital photograph of LED powered by three supercapacitors of G-Mo20 connected in series at bending condition 180°. (D) CV curves of one, two, and three supercapacitors connected in series at scan rate 10 mV s$^{-1}$ of G-Mo20 at 180°. (E) Specific capacitance, (F) Ragone plot (H) Capacitance retention of the G-Mo20 and CNT-Mo20 based supercapacitor devices.
Figure 5B:
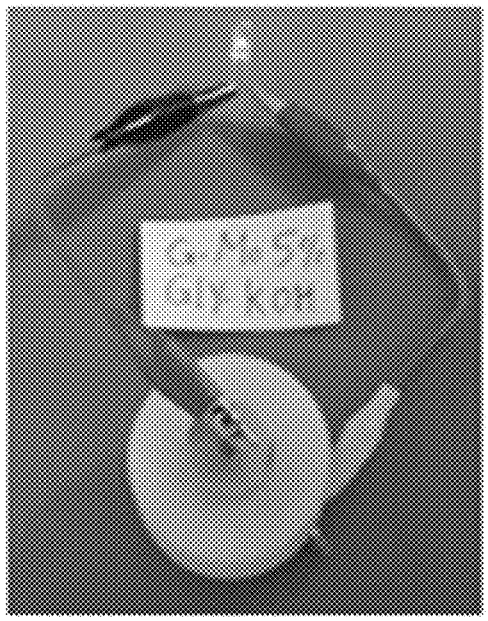
Figure 5C:
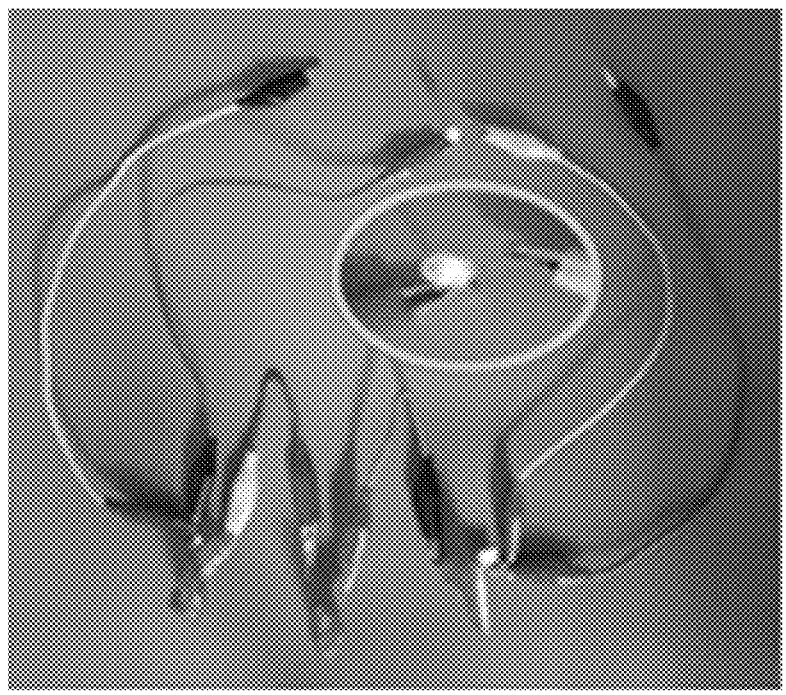

In an embodiment, the supercapacitor is flexible and can be bent at 90°, or 180° (FIG. 5A). In an embodiment, 2-10, preferably 3-9, 4-8, or 5-7 of the supercapacitor devices are connected in parallel and/or series (FIG. 5C). In another embodiment, the supercapacitor device is electrically connected to a sensor in a wearable electronic device and functions as a battery.

EXAMPLES

The following examples describe and demonstrate nanocomposite electrodes, a supercapacitor comprising said nanocomposite electrodes, and exemplary embodiments of the synthesis of molybdenum-doped carbon nanotubes and graphene are described herein. The examples are provided solely for the purpose of illustration and are not to be construed as limitations of the present disclosure, as many variations thereof are possible without departing from the spirit and scope of the present disclosure.

Example 1: Materials

Kuraray active carbon (AC) and conductive carbon (CC) for supercapacitor electrode, HSV 900 PVDF (polyvinylidene fluoride) binder for Li-ion battery electrodes, Timical super C65 application (conductive additive) were obtained from MTI (USA). 1-Methyl-2-pyrrolidone (NMP), ammonium molybdate tetrahydrate (AM), $((NH_4)_6 Mo_7O_{24} \cdot 4H_2O)$, hydrochloric acid (HCl) carbon nanotubes (CNT), and graphene (G) were provided from Merck. Glycerol and potassium hydroxide were received from Sigma-Aldrich.

Example 2: Synthesis of CNT-Mo and G-Mo Electrodes

CNT-Mo and G-Mo nanocomposites were synthesized by reaction of AM with CNT, and G, respectively. 100 mg of CNT or G were heated at 500° C. to 30 minutes to obtain crack formation on the structures, then dispersed in deionized water via ultrasonication. The pH of the solution was set 2.0 by adding hydrochloric acid and 1.0 g of AM was added to the suspension under stirring, which was then magnetically stirred at room temperature for 3 days. After filtration and washing samples were dried in an oven at 80° C. where both CNT-Mo and G-Mo were obtained (FIG. 1).

Example 3: Electrode/Electrolyte Preparation

Carbon hosting electrode slurry was prepared by mixing of 80% (w/w) of active carbon (AC), 10% of (w/w) PVDF, and 10% (w/w) of conductive carbon (CC) and further homogenized at constant stirring for 2 h at 70° C. Different ratios 5, 10, and 20% of CNT-Mo or 5, 10, and 20% G-Mo were mixed to the carbon slurry and further stirred for 1 h at 70° C. to prepare G-MoX and CNT-MoX, where X=5, 10 and 20 respectively. Then, the obtained carbon composites were uniformly coated on an aluminum current collector by using an automatic coating machine (MRX Shenzhen Automation Equipment). A standard oven was used to dry the sheet at 70° C. and then they were cut into circular electrodes utilizing a disk cutter. A digital photo of CNT-Mo20 electrodes exhibit a high degree of flexibility as shown in a digital photograph (FIG. S1.a), whereas FIGS. S1b and c show the surface morphology and cross-section of the CNT-Mo20 electrode via SEM analysis. Gly/KOH (1M) electrolyte was prepared and homogenized by under stirring at 50° C. and then stored under vacuum environment before use.

Example 4: Materials Characterization and Electrochemical Measurement

The morphologies of the materials were obtained directly by Transmission Electron Microscopy (TEM) (Morgagni 268) and Scanning Electron Microscopy (SEM) (TESCAN VEGA3). Energy-dispersive X-ray spectroscopy (EDX) measurements were carried out with an EDAX. X-ray diffraction (XRD, Shimadzu XRD-7000) was used to investigate the crystalline structure of the products with monochromatic high-intensity Cu Kα radiation ($\lambda=1.5406$ Å) and $2\theta=5-70°$ by a scan rate of $0.5° \, min^{-1}$. The FTIR spectra of the electrode were studied in the range of 450-4000 $cm^{-1}$ by Perkin Elmer Fourier-transform infrared spectrophotometer, Spectrum Two™.

Supercapacitor devices were fabricated using the configuration: Composite Electrode/Gel electrolyte/Composite Electrode. The Gly/KOH gel was used as electrolyte material to supply ions to the system to store the energy. The cyclic voltammetry (CV) and galvanostatic charge-discharge (GCD) experiments were carried out using Gly/KOH in CNT-Mo and G-Mo-based supercapacitors. The supercapacitor devices were assembled into the split cell assembly. GCD analysis was done at different currents ranging from 0.5 to 5 mA and cut-off voltage was set between −1 to 1 V. The supercapacitor cell was then assessed at different scan rates ranging from 10 to 150 mV $s^{-1}$. Cyclic voltammetry (CV) of the devices was investigated by using a Palmsens enstat-4 electrochemical analyzer.

The structural morphology of the samples was investigated by TEM as shown in FIG. 1. A pure tube-like CNT structure with a narrow diameter is represented in FIG. 1a. It is clear from the TEM image $MoO_3$ nanoparticles interconnected with multiwall CNT after 3 days of vigorous stirring (FIG. 1C), FIG. 1B shows pure graphene sheets with a wrinkled-like structure. The TEM image shows that the Mo-bonded nanolayers are transformed into a thick structure with a Mo-expanded graphene surface. The X-ray diffraction (XRD) patterns of the products pure graphene and carbon nanotubes shown in (FIG. 6A). The diffraction peaks of graphene and carbon nanotubes reflections occurring at ~25.9° and 43.4° belong to (002) and (100) planes, respectively. According to the (JCPDS-ICDD card no. 00-008-0415) the typical main peak is observed which belongs to carbon. The change in the intensity of peaks is an effect of the inserting of Mo in the structure. It is noted that the samples G-Mo20 and CNT-Mo20 composite exhibits a similar pattern to the pure G and CNT except for a few weak peaks from α-$MoO_3$ at around 12°, 20°, 52° and 68° assigned to the (020), (110), (002) and (202) crystallographic planes of the α-$MoO_3$ phase (JCPDS-CDD card 05-0508), respectively, possibly due to the low diffracting intensity of the latter.

FIG. 6B demonstrates the FTIR spectrum of ammonium molybdate (AM), G, CNT, G-Mo20, and CNT-Mo20. The spectrum of carbon (CNT and G) illustrates a soft plot, while ammonium molybdate shows broad feature around 3600-2600 $cm^{-1}$ corresponds to the stretching mode of the O—H bond indicating the presence of OH groups. Two significant peaks of AM exhibit at ~1416 and 1634 $cm^{-1}$ were ascribed to the N—H vibration band and water molecular, respectively. At 573, 812, and 878 $cm^{-1}$, AM shows strong vibrations due to stretching of Mo—O bond and stretching and bending bonds of Mo—O—Mo. For G-Mo20 and CNT-Mo20 samples, the peaks of OH stretching vibration almost disappeared, while peaks of molybdate appeared with little shifting and low intensity. The intensity of vibrations of Mo—O and Mo—O—Mo reduced noticeably and shifted to 523 and 837 cm$^{-1}$ for CNT-Mo, while G-Mo showed a weak band at 843.2 cm$^{-1}$ and disappeared other peaks.

The SEM images (FIGS. 2A and B) show that Mo is homogeneously distributed in carbon nanotubes and graphene nanocomposite electrode. The homogeneous distribution of elements in the active electrode materials was well obtained from elemental mapping of CNT-Mo20 and G-Mo20 via EDX analysis. It was observed that carbon, oxygen, and molybdenum are uniformly distributed in the electrode structure. The EDX spectrum (FIG. 7) shows successful doping of Mo onto the carbon nanotubes and graphene which is consistent with the result of XRD and FTIR analysis.

Figure 3A:
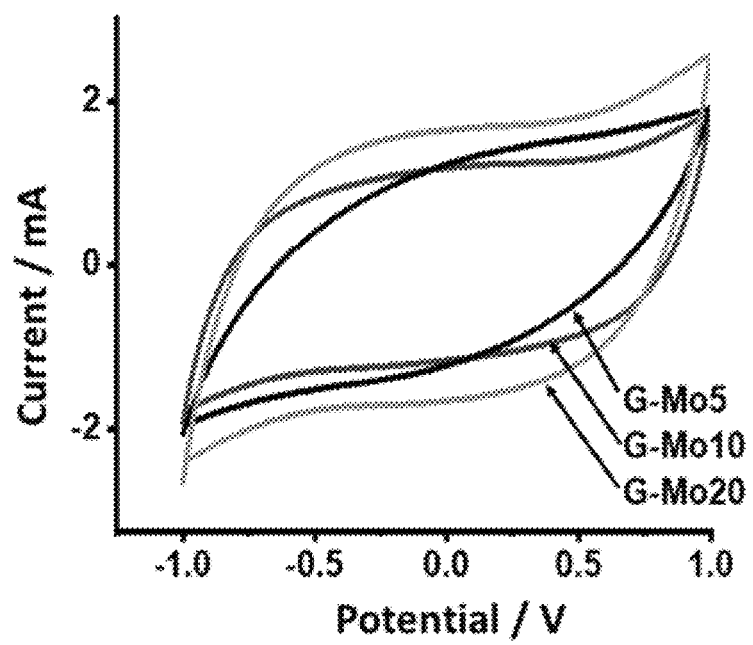
FIGS. 3A-3F are graphs illustrating (A) CV curves of G-Mo5, G-Mo10, and G-Mo20 at scan rate 10 mV s$^{-1}$ in a potential range −1 to +1 V. (B) CV curves of CNT-Mo5, CNT-Mo10, and CNT-Mo20 at scan rate 10 mV s$^{-1}$ in a potential range −1 to +1 V. (C) EIS plots of G-Mo5, G-Mo10, and G-Mo20. (D) EIS plots of CNT-Mo5, CNT-Mo10 and CNT-Mo20. (E) CV curves of G-Mo20 at various temperatures (21-70° C.) at a scan rate 10 mV s$^{-1}$ (F) EIS curves of G-Mo20 at various temperatures (21-70° C.
Figure 3B:
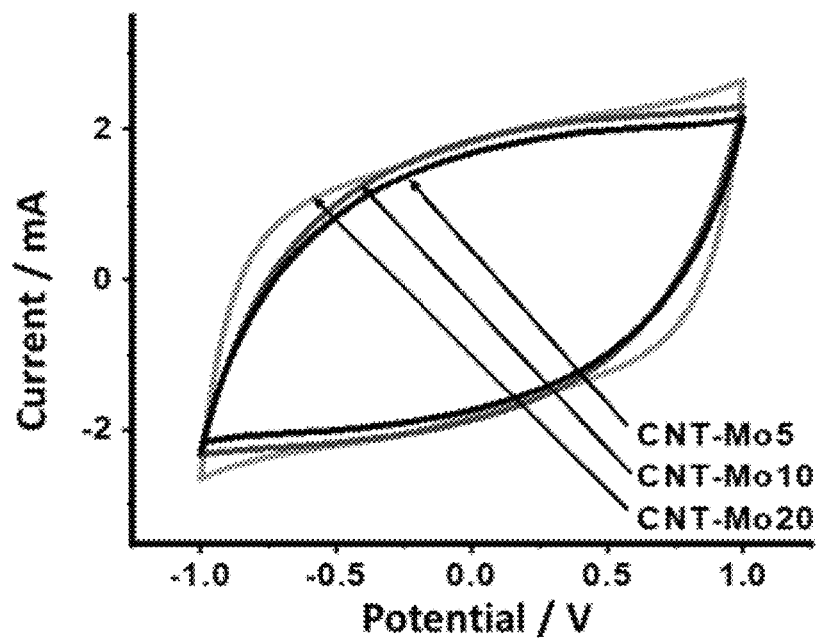
Figure 3C:
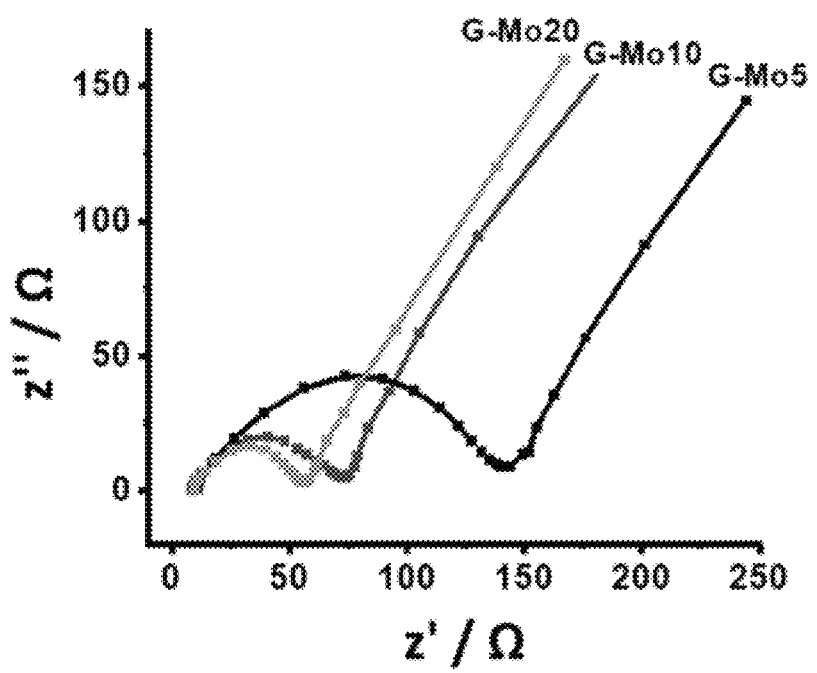
Figure 3D:
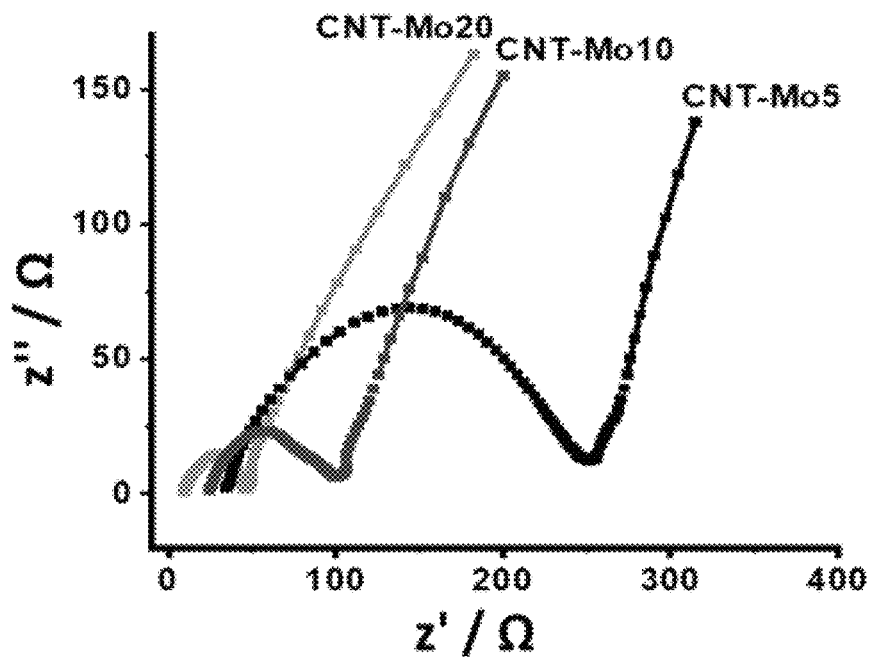

The CV measurements of G-Mo-based and CNT-Mo-based supercapacitors at a dispersion ratio of 5, 10, and 20% were studied at a broad potential window of −1 to +1 V range at a scan rate of 10 mV s$^{-1}$. CV patterns of all devices (FIGS. 3A and B) demonstrated similar behavior with quasi rectangular shape indicating a suitable electric double-layer capacitor (EDLC) behavior. For G-Mo electrodes, the area between forward-reverse scan of CV curve increased with increasing Mo concentration, where the highest capacitance obtained from the G-Mo20-based electrode. The oxidation-reduction peaks of Mo are not observed in the CV curves referring to the low content of redox species and thus the pseudo-capacitance effect could be suppressed by the EDLC. However, to show the effectiveness of the electrolyte in a supercapacitor, the ion diffusions capability of the anhydrous Gly-KOH was examined at variable scan rates from 10 to 150 mV s$^{-1}$. These curves exhibited that the supercapacitor has reversible charge-discharge capacitive properties. The CV curves of the CNT-Mo20-based device (FIG. 3B) had similar profiles in the same potential window, where CNT-Mo20 was larger than those of the CNT-Mo5 and CNT-Mo10 based devices. At various scan rates from 10 to 150 mV s$^{-1}$, CV curves reserved their quasi-rectangular form up to 40 mV. The curves tend to distort at the higher scan rates starting from 60 mV s$^{-1}$ show the CNT-Mo-based electrodes are not favorable at rates compared to G-Mo-based electrodes. Electrochemical impedance spectroscopy (EIS) reveals the frequency-based Nyquist graphs of the fabricated supercapacitors by fitting to the equivalent circuit. In the high-frequency area, Nyquist plots exhibited a semi-circle, followed by a straight line in the low-frequency area (FIGS. 3C and D). The equivalent series resistance (ESR), which includes many factors such as the resistance of the electrolyte, the electrical resistance of the electrode material, and contact resistance between the electrolyte and the electrode material, the interfacial resistance between the current collector, and the diffusion resistance of the ions in the electrolyte was measured (Table 1). See G. Lee, S. K. Kang, S. M. Won, P. Gutruf, Y. R. Jeong, J. Koo, S. S. Lee, J. A. Rogers, J. S. Ha, Fully Biodegradable Microsupercapacitor for Power Storage in Transient Electronics, Adv. Energy Mater. 7 (2017) 1700157; and V. Rajendran, A. M. V. Mohan, M. Jayaraman, T. Nakagawa, All-printed, interdigitated, freestanding serpentine interconnects based flexible solid state supercapacitor for self powered wearable electronics, Nano Energy. 65 (2019) 104055, each incorporated herein by reference in their entirety. The internal resistance of the CNT-Mo was higher than G-Mo, which becomes lower conductivity for the electrodes. A lower ESR value (G-Mo) indicates higher ionic conductivity that electrode/electrolyte creates a convenient pathway for faster diffusion. The charge transfer resistance (Rct) has been calculated using the equivalent circuit diagram and the data fitted by special software (CorrTest Electrochemical Analyzer). The Rct for G-MoX and CNT-MoX shows that increase concentrations of G-Mo and CNT-Mo enhance the conductivity of the device electrodes (Table 1).

TABLE 1

ESR, Rct, and ionic conductivity with carbon electrodes including G-MoX and CNT-MoX.

| Device | $E_{SR}$ (Ω) | $R_{ct}$ (Ω) | σ (S cm$^{-1}$) |
|---|---|---|---|
| G-Mo5 | 10.63 | 59.85 | 0.00133 |
| G-Mo10 | 9.5 | 28.38 | 0.00150 |
| G-Mo20 | 8.53 | 18.64 | 0.00166 |
| CNT-Mo5 | 34.78 | 109.52 | 0.00041 |
| CNT-Mo10 | 24.25 | 38.7 | 0.00058 |
| CNT-Mo20 | 9.25 | 9.79 | 0.00153 |

The ionic conductivity of the device with the electrodes bearing G-MoX and CNT-MoX were calculated using Eq. (1) at room temperature.

$$\sigma(S/cm) = L(cm)/R(\Omega) \times A(cm^2) \tag{1}$$

Figure 3E:
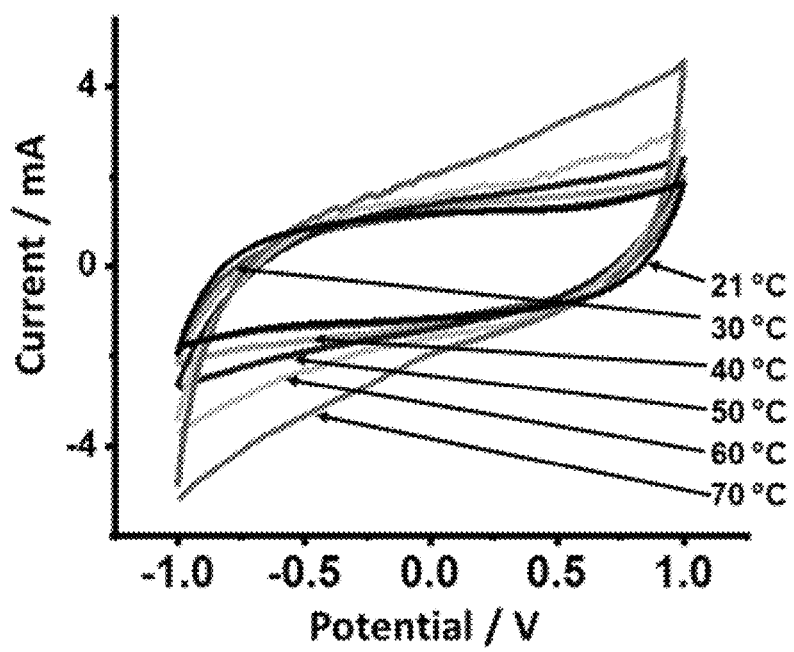
Figure 3F:
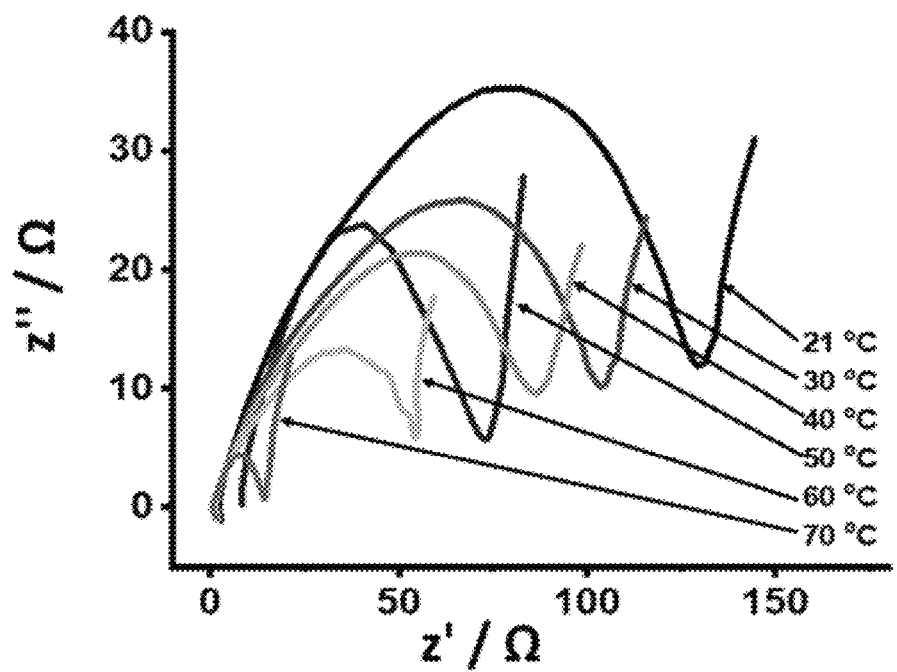

The temperature resistance behavior of the fabricated device ((G-Mo20)-based electrode) was studied by CV and EIS measurements under a temperature range between 21° C. and 70° C. (FIGS. 3E and F). Depending on the temperature increase (from 21° C. to 50° C.), the CV curves almost preserved the area under the forward-reverse scans at a scan rate of 10 mV s$^{-1}$. As the temperature rises to 70° C., the supercapacitor capacitive performance increases, as shown by the CV profile and reduced Rct value in EIS spectra. These results shows the fabricated supercapacitors devices have a great potential to work at a broad temperature domains and give more efficiency at higher temperatures.

Galvanostatic charge-discharge (GCD) profiles of the fabricated devices including various types of electrodes (pure carbon, G-Mo, and CNT-Mo) with Gly/KOH anhydrous gel electrolyte were measured at different currents from 0.5 mA to 5 mA within the potential range of −1 V to +1 V (FIG. 4). FIG. 4A shows the GCD profile of pure carbon electrode containing supercapacitor using Gly/KOH anhydrous gel electrolyte. The G-Mo20-based and CNT-Mo20-based devices exhibited a longer discharge time and a lower voltage drop as compared the other devices. The discharge time of the CNT-Mo20-based electrode was obtained as 982 s at a corrent of 0.5 mA (FIG. 4B). This was 1.5 times higher than that of the CNT-Mo5-based electrode (544 s), and 1.8 times higher than that of the CNT-Mo10 device (640 s). While the G-Mo20-based electrode exhibited a performance of 993 s (FIG. 4C) which was 1.3 and 1.6 times higher than that of the G-Mo5-based device (598 s) and CNT-Mo10-based device (769 s), respectively. The G-Mo20 and CNT-Mo20 electrodes had a longer discharge time (5.2 times) and superior electrochemical stability (FIG. 4D) when compared to pure carbon-based electrodes. The GCD charts varied in behavior depending on the current, demonstrating that it could work with great performance even at high current.

Figure 4A:
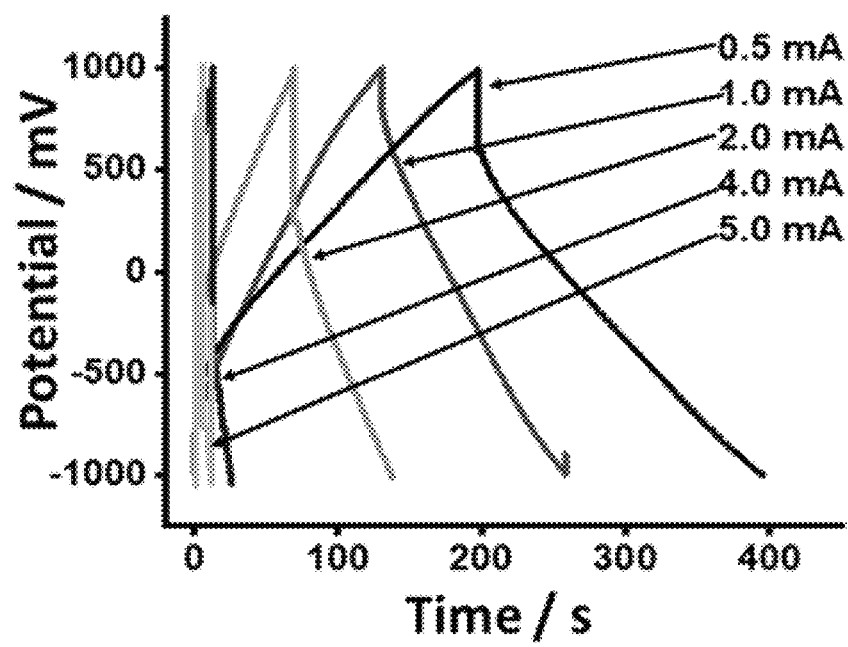
FIGS. 4A-4F are graphs illustrating GCD curves of (A) pure carbon, (B) G-Mo20, (C) CNT-Mo20, at current from 0.5 to 5 mA in the voltage range of −1 to 1 V. (D) GCD curves of pure carbon, G-Mo20, and CNT-Mo20 at current 0.5 mA in the voltage range of −1 to 1 V. GCD profiles of indifferent potential windows (E) G-Mo20 and (F) CNT-Mo20 at a current of 0.5 mA.
Figure 4B:
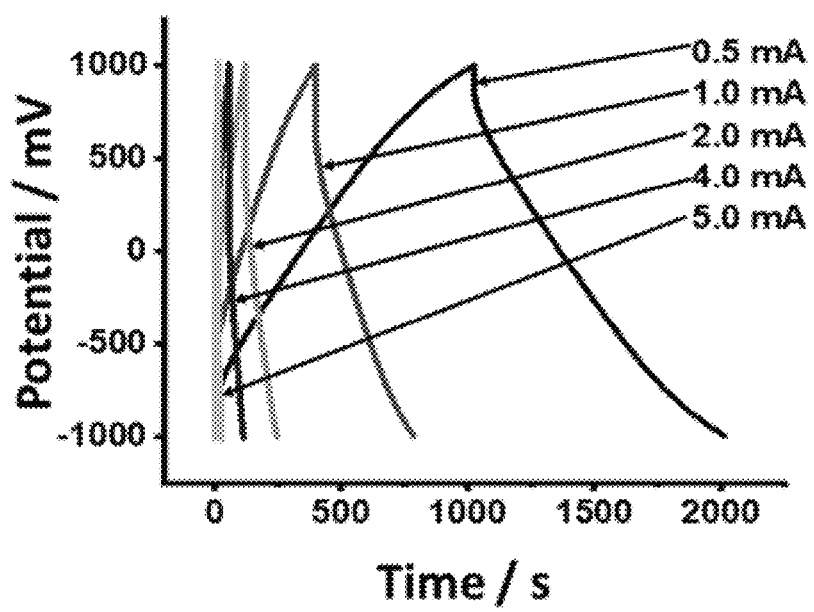
Figure 4C:
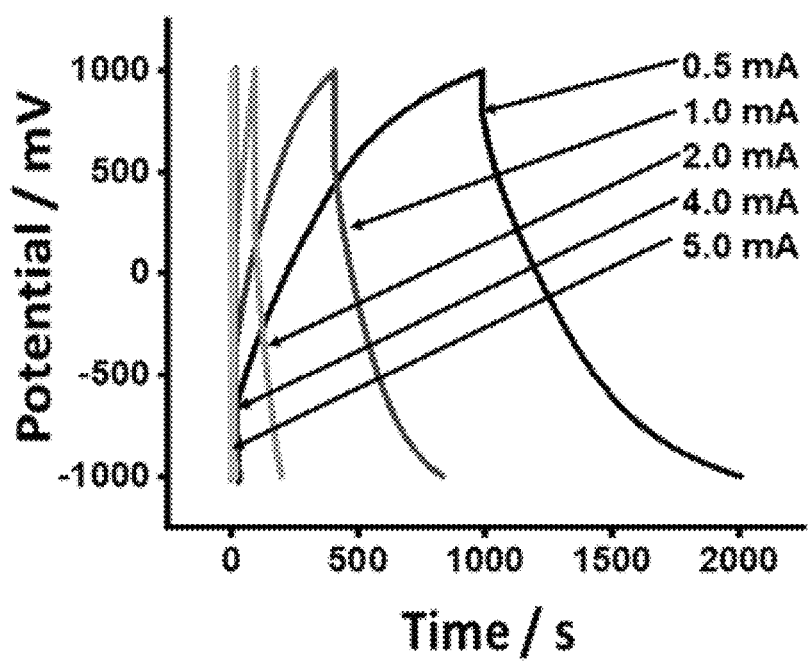
Figure 4D:
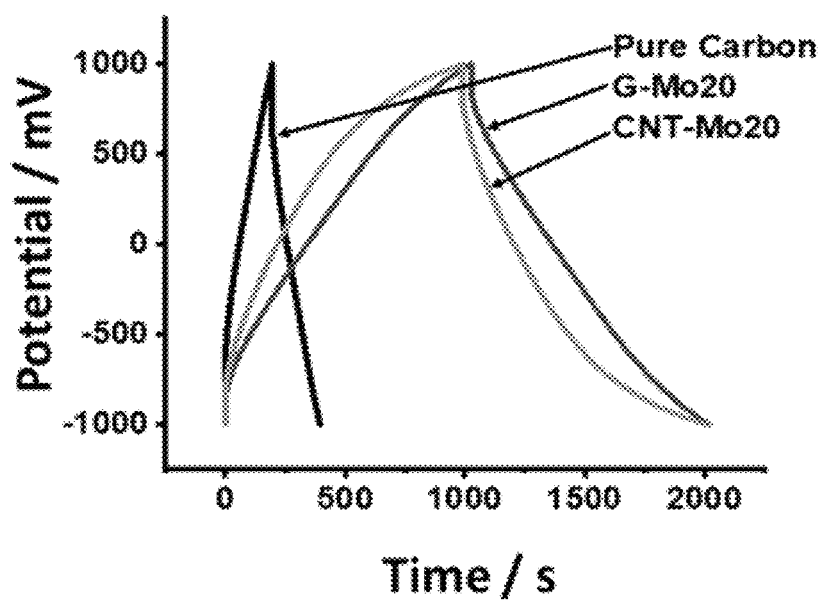
Figure 4E:
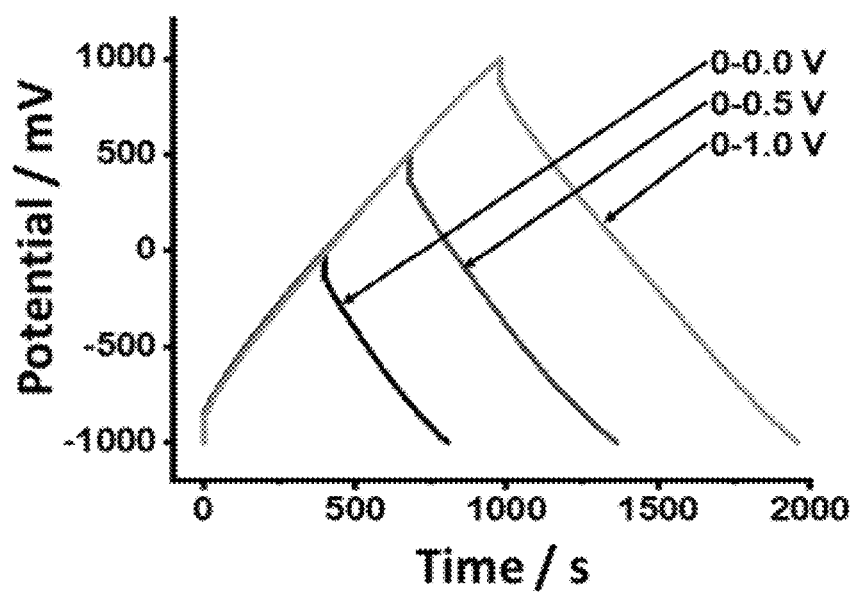
Figure 4F:
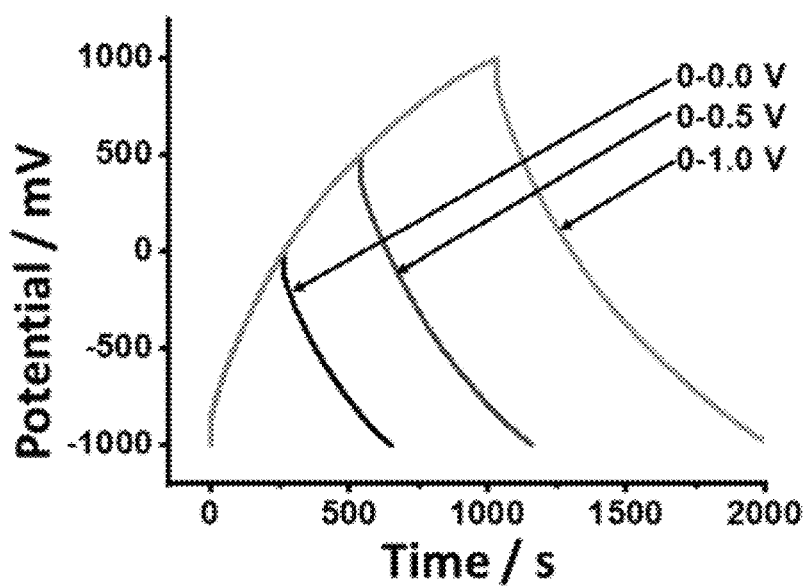

In electrochemical energy storage systems, the operating performance of devices in different voltage ranges is an important factor. GCD measurements performed at different voltage ranges for both systems (G-Mo20 and CNT-Mo20) are shown in FIGS. 4E and 4F, respectively. The results obtained show that both systems reveal very efficiently in measurements made at different voltages. In addition, the CV studies G-Mo20 and CNT-Mo20 (not shown) confirming the GCD measurements at different voltages at the scan potential windows of −1.0-0.0, −1.0-0.5, and −1.0-1.0 V. It was observed that CV curves maintained their quasi-rectangular profile in all voltage windows.

Figure 5D:
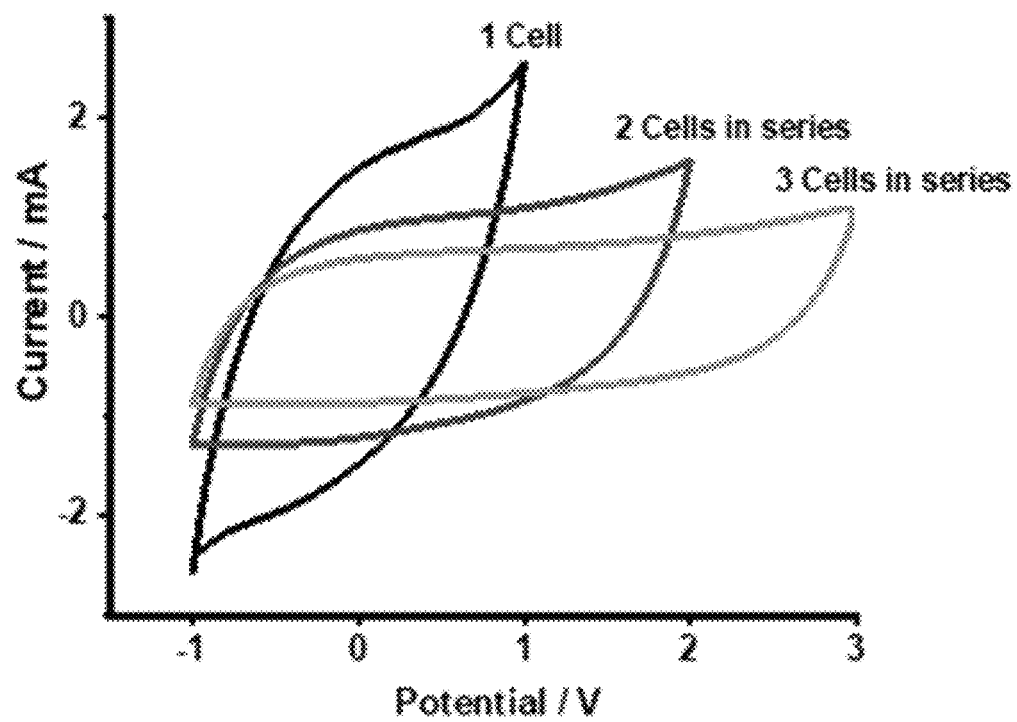

The flexibility of G-Mo20 and CNT-Mo20-based supercapacitor devices were evaluated by measuring their electrochemical performance using CV at different bending conditions (not shown). CV curves show the device delivered almost a similar behavior at different bending angles and maintained the same capacitance. Real images of the flexible devices are represented in FIG. 5A. FIG. 5B shows operational LED test of 5% Mo containing device in a split cell assembly. It was observed that the G-Mo5 electrode provides the lowest capacitive performance (based on calculations) but can still power the LED. Three supercapacitor devices with G-Mo20 electrodes connected in series are shown in FIG. 5C while powering the LED. These supercapacitor devices show excellent flexible durability at a bending state of 180°. To investigate the performance under series connection two and three supercapacitor devices were connected in series at high bending angles (180°). CV measurement has been performed under the bending condition of 180°. Results revealed that the fabricated devices are capable of giving high performance under different conditions while in a series connection (FIG. 5D). As shown in FIG. 5C, a digital photograph of three series-connected devices (G-Mo20-based) powering a light-emitting diode (LED) at a bending condition of 180°.

Figure 5E:
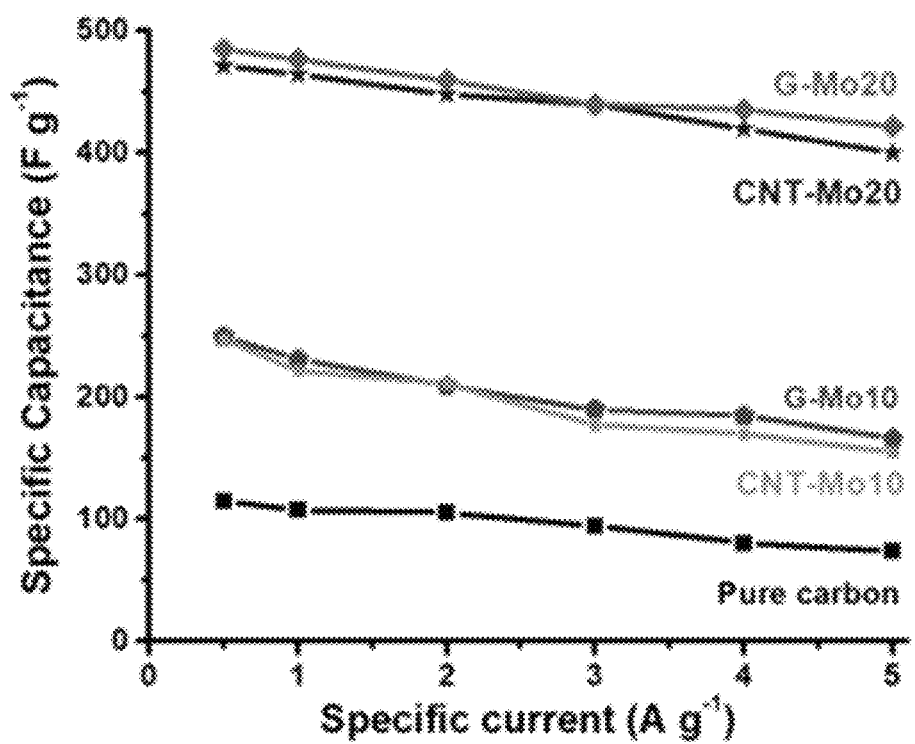

FIG. 5E shows the specific capacitances ($C_s$) of pure carbon, G-Mo20, and CNT-Mo20 based supercapacitors at different specific currents (0.5, 1, 2, 4, and 5 mA). C, calculations have been performed through the non-linear GCD curves by applying Eq. (2). See N. Yadav, M. K. Singh, N. Yadav, S. A. Hashmi, High performance quasi-solid-state supercapacitors with peanut-shell-derived porous carbon, J. Power Sources. 402 (2018) 133-146; and A. Laheäär, P. Przygocki, Q. Abbas, F. Béguin, Appropriate methods for evaluating the efficiency and capacitive behavior of different types of supercapacitors, Electrochem. Commun. 60 (2015) 21-25, each incorporated herein by reference in their entirety.

$$C_s, \text{Cell}=I\int Vdt/w \times \Delta V \quad (2)$$

where, I is the discharge current; Vdt represents the area under the discharge curve (GCD curve), while w corresponds to the total weight of both electrodes and redox-active species, and $\Delta V$ is the operating voltage range, initial voltage-final voltage. The total mass of active material in an electrode was weighed 1 mg. See A. Laheäär et al.; and N. Yadav, N. Yadav, S. A. Hashmi, Ionic liquid incorporated, redox-active blend polymer electrolyte for high energy density quasi-solid-state carbon supercapacitor, J. Power Sources. 451 (2020) 227771, each incorporated herein by reference in their entirety. The $C_s$ values for the fabricated supercapacitors (G-Mo20 and CNT-Mo20) were calculated using Eq. (2) and a maximum capacitance of 474 F g$^{-1}$ and 468 F g$^{-1}$ was reached at a specific current of 0.5 A g$^{-1}$, respectively. These capacitances are significantly higher than that of pure carbon-containing device has a $C_s$ of 133 F g$^{-1}$.

Figure 5F:
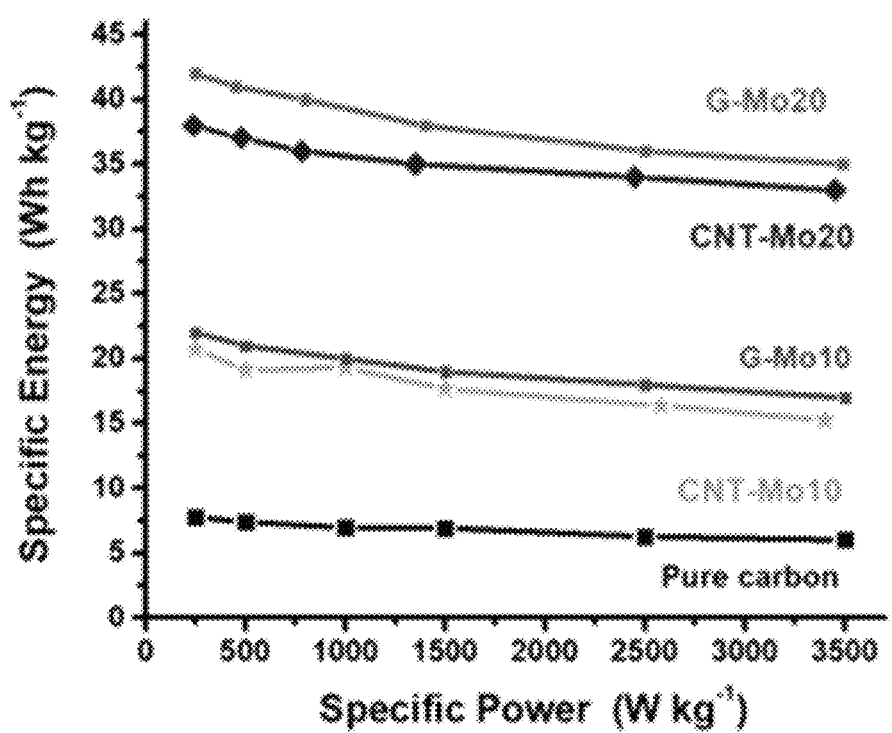

FIG. 5F shows specific Energy (E) and specific power (P) performances of G-Mo20 and CNT-Mo20 based supercapacitors were investigated by using the Eqs. (3 and 4).

$$E = \frac{1}{2w} \times C_s (\Delta V^2)/3.6 \quad (3)$$

$$P = E \times (3600/\Delta t) \quad (4)$$

The symmetric supercapacitor with G-Mo20 has achieved maximum specific energy of 46 Wh kg$^{-1}$ at a specific power of 280 W kg$^{-1}$. At the same discharge rates (1 mA), the energy density of the CNT-Mo20-containing device delivered specific energy of 37 Wh kg$^{-1}$ and it is decreased slightly to 33 Wh kg$^{-1}$ at a power of 270 W kg$^{-1}$. This demonstrates that the device performs well even at large discharge currents.

Figure 5G:
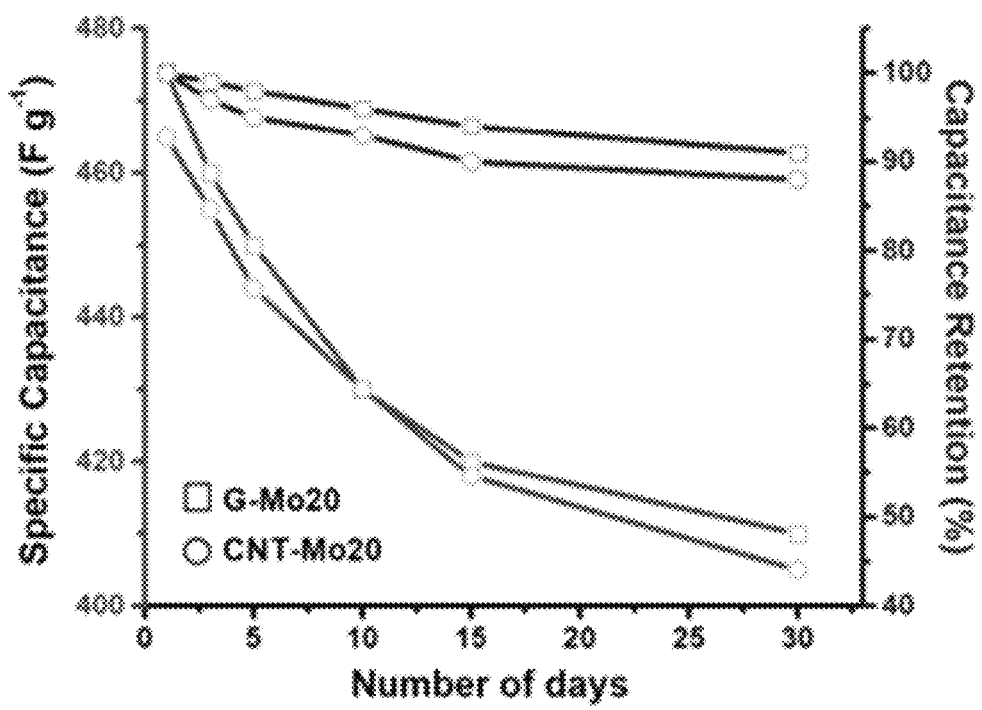

Cyclic stability interms of capacitance retention of supercapacitor devices (G-Mo20 and CNT-Mo20) are obtained from the GCD cycles at 1 A g$^{-1}$ current density. Both (G-Mo20 and CNT-Mo20) devices exhibited consistent behavior throughout the stability tests and the devices have lost only 10% and 13% of their original performance after 30 days continuous GCD measurements, respectively (FIG. 5G). A remarkable specific capacitance retention of 10% and 12% was obtained from the G-Mo20 and CNT-Mo20 devices after 10.000 cycles, respectively. It was observed that CNT-Mo20 based device has maintained almost 84% columbic efficiency of its initial performance (not shown).

Herewithin, the fabrication of two different types of electrodes based on CNT and G nanocomposites is reported. The nanocomposites, G-MoX and CNT-MoX were produced by thermal methods with a corresponding loading (X: 5, 10, and 20%). The proposed approach offered numerous advantages such as simplicity, low cost, and the possibility of scale-up. The G-Mo and CNT-Mo nanocomposites offered unique physicochemical properties such as excellent flexibility and better chemical and electrochemical stability. Flexible symmetric supercapacitors were successfully assembled with electrodes, G-MoX, and CNT-MoX using Gly/KOH gel electrolytes. The symmetric supercapacitors exhibit a high-voltage region, high specific energy, reasonable rate capability, and remarkable cycling performance. The (G-MoX and CNT-MoX) based electrodes were successfully applied to flexible supercapacitors with thermal stability and high capacitance retention of 90% and 88% up to 10.000 cycles. They provided corresponding specific energy of 46 Wh kg$^{-1}$ and 37 Wh kg$^{-1}$ at a specific power of 280 W kg$^{-1}$. A facile and cost-effective synthesis route of G-MoX and CNT-MoX is significant for wearable electronics and may pave the way for the development of flexible on-body devices. These results show that improved performance in terms of capacitance, specific energy and cyclic durability is achieved by the manufactured supercapacitor devices of the current disclosure compared to previously reported devices.

Obviously, numerous modifications and variations of the present disclosure are possible in light of the above teachings. It is therefore to be understood that within the scope of the appended claims, the invention may be practiced otherwise than as specifically described herein.

The invention claimed is:
1. A gel electrolyte split cell supercapacitor, comprising:
two nanocomposite electrodes, each nanocomposite electrode comprising:
a substrate;
at least one binding compound;
at least one conductive additive; and
at least one molybdenum doped carbon material;
wherein a mixture of 5-10 wt % of the at least one binding compound, 65-92 wt % of the at least one conductive additive, and 3-25 wt % of the at least one molybdenum doped carbon material based on the total weight of the at least one binding compound, the at least one conductive additive, and the at least one molybdenum doped carbon material, at least partially coats a surface of the substrate;
wherein the nanocomposite electrodes face one another, wherein the substrate of each nanocomposite electrode is at least partially coated with the mixture on an inside facing surface and the outer surfaces of each of the nanocomposite electrodes are not coated with the mixture; and
wherein the inside facing surfaces are separated by at least one gel electrolyte that at least partially penetrates the molybdenum doped carbon material,
wherein the gel electrolyte comprises at least one polyol compound mixed with at least one selected from the group consisting of an alkali metal salt and an alkaline earth salt.

2. The gel electrolyte split cell supercapacitor of claim 1, wherein:
the at least one molybdenum doped carbon material is at least one selected from the group consisting of molybdenum doped graphene and molybdenum doped carbon nanotubes (CNTs);
the at least one binding compound is at least one selected from the group consisting of polyvinylidene fluoride and n-methylpyrrolidone;
the at least one conductive additive is at least one selected from the group consisting of graphite, activated carbon, reduced graphene oxide, carbon nanotubes, carbon nanofibers, and carbon black; and
the substrate is a formed from at least one material selected from the group consisting of copper, aluminum, nickel, iron, and steel.

3. The gel electrolyte split cell supercapacitor of claim 1, wherein the molybdenum in the at least one molybdenum doped carbon material is at least one selected from the group consisting of $\alpha$-MoO3, $\beta$-MoO3, and $\gamma$-MoO3.

4. The gel electrolyte split cell supercapacitor of claim 1, wherein molybdenum is homogeneously distributed throughout the at least one molybdenum doped carbon material.

5. The gel electrolyte split cell supercapacitor of claim 1, wherein the at least one molybdenum doped carbon material is molybdenum doped graphene;
the graphene of the at least one molybdenum doped carbon graphene has a sheet structure;
molybdenum is on a surface of sheets of the sheet structure; and
the at least one molybdenum doped graphene comprises 70-80 wt % C, 15-20 wt % O, 4-8 wt % H, and 3-10 wt % Mo, based on the total weight of the C, O, H, and Mo.

6. The gel electrolyte split cell supercapacitor of claim 1, wherein the at least one molybdenum doped carbon material is molybdenum doped CNTs;
the molybdenum doped CNTs have a diameter of 10-100 nm;
molybdenum is on walls of the CNTs; and
the molybdenum doped CNTs comprise 60-70 wt % C, 20-25 wt % O, 4-8 wt % H, and 10-20 wt % Mo, based on the total weight of the C, O, H, and Mo.

7. The gel electrolyte split cell supercapacitor of claim 1, wherein the thickness of the coating of the mixture on the substrate is 500 nm-60 μm.

8. The gel electrolyte split cell supercapacitor of claim 1, wherein the at least one molybdenum doped carbon material is made by a method comprising:
heating a carbon material to at least 450° C. for 10 minutes to an hour to form a cracked carbon material;
wherein the carbon material is carbon nanotubes or graphene;
sonicating the cracked carbon material in water for at least 5 minutes to form a dispersion;
adjusting the pH of the dispersion to 1.5-3 with an acid to form a suspension;
mixing $MoO_4^{2-}$ molybdate ion into the suspension and stirring for at least 48 hours at 20-25° C. to form a solution;
filtering, washing with water, and drying the solution at a temperature of at least 70° C. for at least 3 hours, to form the at least one molybdenum doped carbon material.

9. The gel electrolyte split cell supercapacitor of claim 1, wherein the at least one polyol compound is selected from the group consisting of glycerol, ethylene glycol, and propylene glycol.

10. The gel electrolyte split cell supercapacitor of claim 1, having:
an energy density of 40-60 Wh/kg at a specific power of 250-300 W/kg; and
wherein the mixture has 15-25 wt % of the at least one molybdenum doped carbon material; and
the at least one molybdenum doped carbon material is molybdenum doped graphene.

11. The gel electrolyte split cell supercapacitor of claim 10, having a specific capacitance of 450-500 F/g at 0.5-5 A/g.

12. The gel electrolyte split cell supercapacitor of claim 11, wherein at least 90% of an initial specific capacitance is maintained after 10,000 charge-discharge cycles.

13. The gel electrolyte split cell supercapacitor of claim 11, wherein at least 88% of the initial specific capacitance is maintained after 10,000 charge-discharge cycles.

14. The gel electrolyte split cell supercapacitor of claim 1, having an energy density of 30-50 Wh/kg at a specific power of 250-300 W/kg;
wherein the mixture has 15-25 wt % of the at least one molybdenum doped carbon material; and
the at least one molybdenum doped carbon material is molybdenum doped carbon nanotubes.

15. A supercapacitor device, comprising:
2-10 of the gel electrolyte split cell supercapacitors of claim 1 connected in parallel and/or series.

16. The gel electrolyte split cell supercapacitor of claim 1, wherein the gel electrolyte comprises glycerol and KOH.

17. The gel electrolyte split cell supercapacitor of claim 1, wherein the gel electrolyte comprises an alkali metal hydroxide and/or an alkaline earth metal hydroxide in an amount of 1-3 M in the polyol.

* * * * *